United States Patent
Middleton

[15] 3,647,380
[45] Mar. 7, 1972

[54] CONTACT LENS HOLDER

[72] Inventor: Robert E. Middleton, 5865 East Powers Ave., Englewood, Colo. 80110

[22] Filed: Nov. 1, 1966

[21] Appl. No.: 591,167

[52] U.S. Cl.....................................51/235, 269/21, 294/64
[51] Int. Cl....................B24b 47/00 B25b 11/00, B66c 1/02
[58] Field of Search.................51/235; 248/326, 363; 279/3; 269/21; 294/1, 64; 206/5

[56] References Cited

UNITED STATES PATENTS 2,384,334   9/1945   Olson.......................................294/64
3,091,328   5/1963   Leonardos..........................294/64 UX
3,274,737   9/1966   Rocher................................51/235 X

*Primary Examiner*—Harold D. Whitehead
*Attorney*—Sheridan and Ross

[57] ABSTRACT

A contact lens holder including a tubular portion constructed for reversably mounting within said holder and which has one end thereof formed for complemental mating with a convex surface of a contact lens and the other end thereof formed for complemental mating with a concave surface of a contact lens. The contact lens holder includes a member having a relatively rigid portion formed adjacent the end of the holder upon which is to be mounted a contact lens to facilitate manipulating and positioning of said end of said holder.

6 Claims, 4 Drawing Figures

PATENTED MAR 7 1972　　　　　　　　　　　3,647,380

INVENTOR.
ROBERT E. MIDDLETON
BY
Sheridan and Ross
ATTORNEYS

CONTACT LENS HOLDER

This invention relates generally to a contact lens holder and more particularly to a contact lens holder including a tubular portion constructed for reversably mounting within said holder and which has one end thereof formed for complemental mating with a convex surface of a contact lens while the other end thereof is formed for complemental mating with a concave surface of a contact lens, and a holder including a relatively rigid portion formed adjacent the end of the holder upon which is to be mounted a contact lens to facilitate the manipulating and positioning of said end of said holder.

Heretofore, many holders for contact lenses, which have utilized a vacuum to secure the contact lens to the lens holder, have been proposed or used. However, although many of these contact lens holders had beneficial application, it has been found that each of same have suffered from one or more disadvantages. For example, none of these contact lens holders could be used with equal facility to engage securely either a convex or a concave surface of the contact lens. More specifically, all prior art contact lens holders were constructed primarily to engage the convex surface of the contact lens and it was hoped that such a holder could also be used to engage the concave surface of the contact lens. Unfortunately, such hope was never realized. Additionally, prior art contact lens holders utilizing the vacuum principle posed a serious problem resulting from the fact that a contact lens secured to one of the contact lens holder could not be maintained in position against a grinding or polishing wheel without adversely affecting the degree of vacuum being maintained within the contact lens holder. Further, operators tended to "overbuff" a contact lens due to the difficulty encountered in securely maintaining a contact lens in a predetermined position. Such overbuffing was quite detrimental since it produced overheating which adversely affected the molecular structure of the lens material thereby producing a contact lens surface which frequently caused eye irritation problems. It has been found, however, that each of the foregoing disadvantages can be easily and inexpensively overcome through the use of a contact lens holder comprising a hollow tubular member which has an annular, concave surface portion formed on one end thereof and an annular, convex surface portion formed on the other end thereof and in which said holder includes a relatively rigid portion disposed adjacent the contact lens being held by the contact lens holder.

Accordingly, one of the principal objects of this invention is to provide an improved contact lens holder.

Another object of this invention is to provide a contact lens holder including a reversable tubular member having an annular, concave surface portion mounted about one end thereof and an annular, convex surface portion formed about the other end thereof.

Another object of this invention is to provide an improved contact lens holder including a relatively rigid portion formed adjacent the part of the contact lens holder which is disposed in engaging contact with the contact lens.

Another object of this invention is to provide a contact lens holder comprising a first member having an inner fluid chamber and a fluid passage interconnecting said fluid chamber with the exterior of said first member, said fluid chamber being surrounded by wall portions at least a part of which is formed from a deformable material; a hollow, tubular member, said tubular member having one end interconnected to said fluid passage to effect a pressuretight fluid connection between the free end of said tubular member and said fluid chamber, said tubular member being constructed for interconnecting either end thereof with said passageway to effect a pressuretight fluid connection between the free end of said interconnected tubular member and said fluid chamber of said first member, said tubular member having an annular, concave surface portion formed about one end thereof for being disposed, in one position of said tubular member relative to said first member, in contacting engagement with a convex surface portion of a contact lens, and an annular, convex surface portion formed about the other end thereof for being disposed, in a second position of said tubular member relative to said first member, in contacting engagement with a concave portion of a contact lens, said surface portions of said tubular end being formed from a relatively soft, yieldable material; and said holder including a relatively rigid portion disposed intermediate said deformable wall part of said first member and the free end of said interconnected tubular member whereby the free end of said interconnected tubular member may be firmly maintained in any one of several positions without affecting the pressure existing within said fluid chamber.

The foregoing and other objects and advantages will become apparent from the specification and drawings in which.

Figure 1:
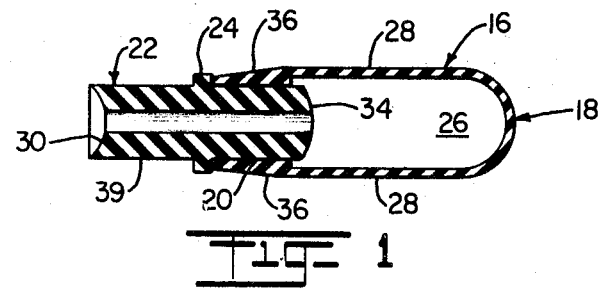
FIG. 1 is an elevational view in cross section of a contact lens holder constructed in accordance with the subject invention.

Referring now to the drawings, in FIG. 1 is shown a preferred embodiment of a contact lens holder 16 constructed in accordance with the subject invention. Holder 16 comprises a hollow, generally cylindrically shaped member 18 having an opening or passageway 20 formed in one end thereof, and a hollow, tubular-shaped member 22 having a boss portion 24 formed about the outer periphery thereof. Member 18 has an inner fluid chamber 26 which is disposed in communication with the opening or passageway 20. Fluid chamber 26 is surrounded by wall portions at least a part 28 of which if formed from a deformable material such as rubber or a rubberlike composition. Tubular member 22 has an annular, concave surface portion 30 (see FIG. 1) formed about one end thereof for being disposed, in one position of said tubular member 22 relative to said member 18, in contacting engagement with a convex surface of a contact lens 32 (see FIG. 2), and an annular, generally convex surface portion 34 (see FIG. 1) formed about the other end thereof for being disposed, in a second position of said tubular member 22 relative to said member 18, in contacting engagement with a concave surface of a contact lens. Tubular member 22, or at least the end portions thereof, is formed from a relatively soft, yieldable material such as rubber or a rubberlike composition. The purpose for this will be later described. It will be noted that the boss portion 24 of tubular member 22 acts as an ultimate stop means to control the inwardly positioning of the tubular member 22 within the opening or passageway 20.

Figure 2:
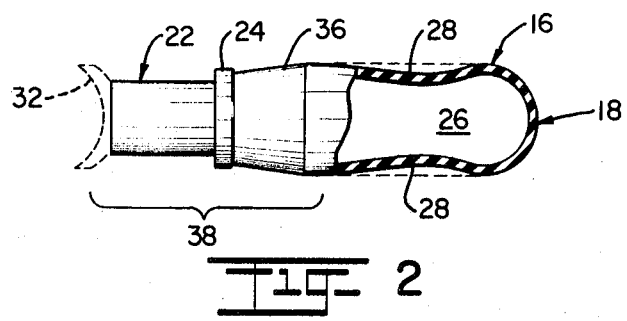
FIG. 2 is an elevational view, in partial cross section, of the contact lens holder shown in FIG. 1 which is being used to hold a contact lens.

Referring to FIGS. 1 and 2, it will be noted that the tubular member 22 and the forward portion 36 of member 18 cooperate to form a relatively rigid portion 38, see FIG. 2, disposed immediately adjacent the end of the tubular member 22 which is disposed in contacting engagement with a contact lens 32. The purpose for this relatively rigid portion 38 will be later described. It will be noted that the wall 39 of tubular member 22 is sufficiently thick to provide enough rigidity and support to the annular, convex surface 30 to minimize the tendency of same to undergo distortion and stretching. As a matter of fact, the thickness of the wall 39 is about one-fourth or more of the diameter of the tubular portion adjacent said end 30, and preferably about 30 percent of said diameter.

Figure 3:
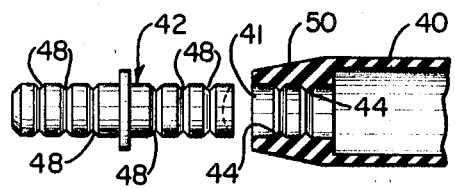
FIG. 3 is an exploded, partial elevational view of another contact lens holder constructed in accordance with the subject invention.

In FIG. 3 is shown an exploded view of another embodiment of a contact lens holder constructed in accordance with the subject invention. The contact lens holder shown in FIG. 6 comprises a member 40 which is generally similar to member 18 shown in FIGS. 1 and 2, and a tubular member 42 which is somewhat similar to tubular member 22 shown in FIG. 1. As a matter of fact, the contact lens holder shown in FIG. 3 is a substantial duplicate of the contact lens holder 16 shown in FIGS. 1 and 2 except for the inwardly extending boss portions 44 formed within in the opening or passageway 46 and corresponding recessed portions 48 formed about the outer surface of tubular member 42. The purpose for the boss portions 44 and the corresponding recessed portions 48 is to provide a cooperative means for precisely controlling the amount of longitudinal length of tubular member 42 that is inserted within the passageway 46 and positioning of said member 42. Further, even though only a relatively short amount of longitudinal length of tubular member 42 is disposed of in passageway 46, it has been found that even under these circumstances tubular member 42 and the forward portion 50 of the member 40 provide a relatively rigid portion adjacent the end of tubular member 42 that is to be disposed in contacting engagement with the contact lens. This is aided in great part due to the cooperative engagement of the boss portions 44 disposed within corresponding recess portions 48.

Figure 4:
FIG. 4 is a partial, elevational view of one end of a tubular member suitable for use in a contact lens holder constructed in accordance with the subject invention.

In FIG. 4 is shown a partial elevational view of one end of a tubular member 52 suitable for use in a contact lens holder constructed in accordance with the subject invention. It will be observed in FIG. 4 that the end of tubular member 52 has an annular beveled edge 54 formed about the periphery thereof. It has been found that the use of a beveled edge 54 is shown provides good sealing engagement between tubular member 52 and the concave surface portion of a contact lens. Thus, the term annular, convex surface as used herein is to be construed as including a surface portion similar to the beveled edge 54 shown in FIG. 4.

Referring now to FIGS. 1 and 2, it will be readily understood that a contact lens 32 which is a delicate element that must be accurately sized for the eye, may be easily and securely gripped by a contact lens holder constructed in accordance with the subject invention by squeezing or deforming the wall portions 28 to force the fluid or air contained therein outwardly of the fluid chamber 26, thence positioning the free end of tubular member 22 against the concave surface portion of a contact lens 32 and then releasing or otherwise reducing the pressure being applied against the wall portions 28. As a consequence of this operation, a reduced pressure is created with in the fluid chamber 26. The deformable wall part 28 will then assume the position as shown in FIG. 2, the dotted lines being representative of position of the wall part 28 prior to mounting a contact lens 32 as shown. This reduction in pressure results in a net pressure force being applied against the concave surface of the contact lens thereby securely holding same against the free end of the tubular member 22. With the contact lens 32 secured to the contact lens holder 16 in this manner, an operator may, by gripping the relatively rigid portion 38 between his thumb and forefinger, suitably position and maintain the contact lens 32 against a grinding edge or a polishing surface without effecting the pressure existing within the fluid chamber 26. However, it will be readily appreciated in light of the foregoing that the contact lens 32 may be easily and quickly removed from the contact lens holder 16 simply by applying pressure once again to the wall portions 28. In the event that it is desirable to polish or buff the convex surface of the contact lens, all the operator has to do is to remove the tubular member 22, reverse the ends thereof and insert tubular member 22 within member 16. Upon performing the foregoing, the concave surface of the contact lens 32 is now ready to be secured to the contact lens holder in the same manner as described above with respect to the concave surface of the contact lens 32. It will be appreciated that the ends of tubular members 22, 48, 74, 82 and 92 are preferably formed from a relatively soft, yieldable material to ensure against any loss of vacuum within the fluid chamber after a contact lens has been secured against an end of any such tubular member.

Although the embodiment shown in FIG. 3 differs somewhat in overall structure, it functions in much the same way as the embodiment shown in FIGS. 1 and 2 and, in light of the foregoing, the use thereof will now be readily understood.

In view of the foregoing, it will be readily appreciated that the reversible tubular member comprising a portion of the contact lens holder described herein presents a substantial surface portion to be seated against a respective surface portion of the contact lens thereby avoiding the problems encountered where only a narrow line of area contact is involved. Thus, the problems heretofore encountered as a result of attempting to secure the contact lens relative to the contact lens holders through the use of a narrow or small annular surface of contact has been completely eliminated by the herein invention. Further, it will be readily understood and appreciated that the contact lens holder described herein is inexpensive to manufacture, is versatile in use and application and is extremely effective in securely holding a contact lens in a predetermined position while same is being ground or polished. Also, a contact lens holder has been described which provides an annular, concave surface to be disposed in contacting engagement with a contact lens and which undergoes a minimum of distortion and stretching during use. Further, since a contact lens may now be securely positioned in a predetermined position, the time required to complete the grinding or polishing operation has been greatly decreased and, as a consequence, a correspondingly smaller quantity of heat is generated thereby minimizing the changes in the molecular structure of the lens which can cause eye irritation.

It is to be understood that this invention is not limited to the exact embodiments of the device shown and described, which are merely by way of illustration and not apparent to those skilled in the art, and it is therefore intended that the appended claims cover all such changes and modifications.

What is claimed is:

1. A contact lens holder comprising: a first member having an inner fluid chamber and a fluid passage interconnecting said fluid chamber with the exterior of said first member, said fluid chamber being surrounded by wall portions at least a part of which is formed from a deformable material; a hollow, tubular member, said tubular member having one end interconnected to said fluid passage to effect a pressuretight fluid connection between the free end thereof and said fluid chamber, said tubular member being constructed for interconnecting either end thereof with said passageway to effect a pressuretight fluid connection between the free end of said interconnected tubular member and said fluid chamber of said first member, said tubular member having an annular, concave surface portion formed about one end thereof for being disposed in one portion of said tubular member relative to said first member, in contacting engagement with a convex surface portion of a contact lens, and an annular, convex surface portion formed about the other end thereof for being disposed, in a second position of said tubular member relative to said first member, in contacting engagement with a concave portion of a contact lens; and said holder including a relatively rigid portion disposed intermediate said deformable wall part of said first member and the free end of said interconnected tubular member whereby the free end of said interconnected tubular member may be firmly maintained in any one of several positions without affecting the pressure existing within said fluid chamber of said first member.

2. A contact lens holder as described in claim 1 in which said tubular member has a surface portion disposed in sealing engagement with a surface portion surrounding said fluid passageway, one of said surface portions having boss portions formed thereon while the other of said surface portions has recessed portions formed thereon, at least one of said boss portions being disposed within at least one of said recessed portions.

3. A contact lens holder as described in claim 1 in which the thickness of the wall of said hollow, tubular member formed adjacent said annular, concave surface area is equal to about one-fourth or more the diameter of said tubular member.

4. A contact lens holder as described in claim 1 in which the surface portions of the ends of said hollow, tubular member are formed from a relatively soft, yieldable material.

5. A contact lens holder comprising a first member having an inner fluid chamber and a fluid passage interconnecting said fluid chamber with the exterior of said first member, said fluid chamber being surrounded by wall portions at least a part of which is formed from a deformable material; and a hollow, tubular member, said tubular member having one end interconnected to said fluid passage to effect a pressuretight fluid connection between the free end thereof and said fluid chamber, said tubular member being constructed for interconnecting either end thereof with said passageway to effect a pressuretight fluid connection between the free end of said interconnected tubular member and said fluid chamber of said first member, said tubular member having an annular, concave surface portion formed upon one end thereof for being disposed in one position of said tubular member relative to said first member, in contacting engagement with a convex surface portion of a contact lens, and the other end thereof having a convex surface formed thereon, for being disposed in a second position of said tubular member relative to said first member, in sealing disposition with respect to a concave portion of a contact lens; said holder including a relatively rigid portion disposed intermediate said deformable wall portion of said first member and the end of said interconnected tubular member whereby the free end of said interconnected tubular member may be firmly maintained at any one of several positions without effecting the pressure existing within said fluid chamber of said first member.

6. A contact lens holder as described in claim 5 in which the thickness of the wall of said hollow, tubular member formed adjacent said annular, concave surface is equal to about one-fourth or more the diameter of said tubular member.

* * * * *